(12) United States Patent
Tapola (10) Patent No.: US 7,366,840 B2
(45) Date of Patent: Apr. 29, 2008

(54) METHOD FOR PROCESSING DATA, A DATA PROCESSING SYSTEM AND A PORTABLE TERMINAL WITH DATA PROCESSING CAPABILITY

(75) Inventor: Pertti Tapola, Kerava (FI)

(73) Assignee: Nokia Corporation, Espoo (FI)

( * ) Notice: Subject to any disclaimer, the term of this patent is extended or adjusted under 35 U.S.C. 154(b) by 725 days.

(21) Appl. No.: 10/286,479

(22) Filed: Nov. 1, 2002

(65) Prior Publication Data
US 2004/0059792 A1 Mar. 25, 2004

(30) Foreign Application Priority Data
Nov. 2, 2001 (FI) ................... 20012126

(51) Int. Cl.
*G06F 12/00* (2006.01)
*G06F 13/00* (2006.01)

(52) U.S. Cl. .............. 711/115; 711/118; 709/217; 709/218

(58) Field of Classification Search ........... 711/115, 711/118; 709/216, 217
See application file for complete search history.

(56) References Cited

U.S. PATENT DOCUMENTS 6,157,982 A 12/2000 Deo et al.
6,394,341 B1 * 5/2002 Makipaa et al. ............ 235/379

FOREIGN PATENT DOCUMENTS

WO WO0210889 2/2002

OTHER PUBLICATIONS

"*Apparatus Enabling Usage of Secondary Memory Storage Devices With a Mobile Telephone*," Research Disclosure 441057, Jan. 10, 2001, p. 65.
E. James Whitehead, Jr. and Meredith Wiggins, "WEBDAV: IETF Standard for Collaborative Authoring on the Web", IEEE Internet Computing, Sep./Oct. 1998.
Foster, J. Geisler, C. Kesselman, S. Tuecke, Managing Multiple Communication Methods in High-Performance Networked Computing Systems, J. Parallel and Distributed Computing 40: 35-48, 1997.

* cited by examiner

*Primary Examiner*—Jack A. Lane
(74) *Attorney, Agent, or Firm*—Ware, Fressola, Van Der Sluys & Adolphson, LLP (57) ABSTRACT

The invention relates to a method for processing data in connection with a portable terminal. In the method, a memory that is external of the terminal is used for storing groups of data, and at least one attribute is determined for said groups of data. Data is stored in the storage of the portable terminal, and at least one group of data can be processed in the portable terminal. In the method, at least one group of data stored in the external memory is selected, and at least one attribute of the selected at least one group of data is transmitted to the portable terminal. The attribute is stored in the portable terminal, wherein when the portable terminal is to process data from the at least one group of data, at least a part of the data from the at least one group of data is transmitted to the storage memory of the portable terminal.

19 Claims, 5 Drawing Sheets

METHOD FOR PROCESSING DATA, A DATA PROCESSING SYSTEM AND A PORTABLE TERMINAL WITH DATA PROCESSING CAPABILITY

CROSS REFERENCE TO RELATED APPLICATIONS

This application claims priority under 35 U.S.C §119 to Finnish Patent Application No. 20012126 filed on Nov. 2, 2001.

FIELD OF THE INVENTION

The present invention relates to a method for processing data in connection with a portable terminal, in which method an external memory that is external of the terminal is used for storing groups of data, at least one attribute is determined for said groups of data, data is stored in a memory of the portable terminal, and at least one group of data can be processed in the portable terminal. The invention further relates to a data processing system comprising a portable terminal, an external memory that is external of the portable terminal for storing groups of data, at least one attribute being defined for said groups of data, and said portable terminal comprising a memory for storing data, and a processor for processing at least one group of data. The invention further relates to a portable terminal, to be used in a communication system, which comprises an external memory that is external of the portable terminal for storing groups of data for which at least one attribute is defined, and said portable terminal comprising a memory for storing data, and a processor for processing at least one group of data.

BACKGROUND OF THE INVENTION

Portable terminals have gained increasing popularity e.g. due to a significant improvement in their performance. Accordingly, a portable terminal can be used for performing a number of functions that were earlier carried out in a workstation PC or a so-called desktop PC. Such portable terminals include laptop PCs. Nevertheless, even a laptop PC can be inconvenient for some purposes. It can e.g. be uncomfortable to carry a laptop when travelling.

Communication devices, such as Nokia 9210 Communicator, and so-called Palmtop PCs and other pocket-size devices have also been developed, these being used for performing data processing functions and their basic functions making them applicable e.g. as portable terminals. The small size of such devices limits the properties of the devices. For example the memory space of this kind of device is fairly limited in size, when compared e.g. with aforementioned laptop PCs and work station PCs. However, e.g. said Nokia 9210 Communicator communication device can be used for processing the same types of files as computers that are larger in size, within the scope of the memory space and the applications of the communication device that are available for this purpose at each moment of time. At present, the relatively small memory size in prior art solutions prevents storing of large files into a small-size terminal. Also, it is not necessarily possible to use applications that require a lot of memory in this kind of portable terminals. In small-size portable terminals FLASH memory is typically used as auxiliary memory instead of fixed disc. One reason for this is that a FLASH memory unit weighs less compared to hard discs, which enables large storing capacity and which are generally used e.g. in desktop PCs and laptop PCs. Nevertheless, the relatively high costs and slow performance capacity of the FLASH memory limit the quantity of memory that can be implemented by the FLASH memory. Thus, the user should, e.g. when leaving the office, store into the memory of the portable device such files which he/she expects to need outside the office. It is not always possible to predict which files to store into the memory of the portable terminal, wherein it may happen that the file needed by the user does not exist in the memory of the portable device. Moreover, another problem in such joint use of a portable terminal and a fixed workstation is that the user should always update the files amended in the portable terminal also into the memory means of the fixed workstation, or in a local area network environment into the memory means of the local area network, such as a hard disc located on the server. Hence, possible further processing of the file on the fixed workstation does not lose the file changes made in the portable terminal. Further, upon storing a file which is relatively large in view of the total available memory, the free memory space of the portable terminal can subsequently be insufficient for any programs to run, or there is not enough memory for the user to store. Typically, terminals run more slowly the less memory there is available for the user. Portable devices with mobile station functions usually comprise also a phone book feature, wherein it is not desirable that storing files would limit the capacity of the phone book almost to nothingness, or even prevent using the phone book. Also, for the usability of other mobile phone functions (phones, facsimile, text messages, data), a sufficient amount of memory should be available, because these are the most critical functions in terminals such as communication devices. The data processing features of portable terminals are mainly used for data processing, recording of notes, browsing of text files and corresponding features with small memory requirements. Applications designed for this kind of purpose require less memory, but their features are more restricted than e.g. the text processing, spreadsheet and graphics applications developed for desktop PCs.

Such portable communication devices have also been developed that enable the user to store music in compressed form and to listen to the stored music. However, storing a piece of music compressed e.g. into mp3 form requires several megabytes of memory, typically of the order of 4 to 10 Mb for one piece of music. Thus, a large portion of the memory of the portable communication is spent on storing pieces of music and, on the other hand, the number of pieces of music that can be stored into the memory of the portable communication device is limited.

The term file is known as such to an expert in the field. In this specification a file refers e.g. to a group of data that is composed of one or a plurality of data items and is processable in a terminal device as a single unit, wherein at least one common attribute, such as a file name, can be defined for the group of data. Data included in the file can be edited and/or deleted and data can be added. Also, the format of the data can usually be changed. Furthermore, new files can be created and existing files can be deleted. Such files include e.g. text files, such as documents, letters etc. drawn up using a text processing application. Other file types are also known, such as spreadsheet files, data base files, presentation files, graphics files, etc. The files are stored into the memory in binary form and the program processing the file performs the necessary steps for presenting the data contained in the file in a format suitable for the user, e.g. on the display of the terminal.

For mutual updating of data in portable computers and desktop PCs/local area network, an arrangement has been developed to automate the updating. For example for the Windows® operating system, a so-called Briefcase feature has been developed, wherein the user can define one or a plurality of directories that will be updated both in the portable terminal and the desktop PC/local area network. Thus, files amended by a single update command are transferred from one terminal to the other, whereafter both usage environments contain the same files related to the directories in question. Nevertheless, this kind or arrangement is ill-suited for situations in which the storage requirements of the updated directory grows large enough to prevent updating of any files in the portable terminal. A part of the updated files may not be needed by the user, wherein unnecessary memory space is wasted on them. In this case the user should manually remove from the memory of the portable terminal those files that he/she regards redundant. However, the user should remember which files stored in the portable terminal are also stored elsewhere, so that the file can also be processed later if necessary.

SUMMARY OF THE INVENTION

An object of the present invention is to bring about a method for processing data in connection with portable terminals, and a portable terminal. The invention is based on the idea that the main storage place of the files is a memory that is external of the portable terminal, wherein one or more attributes stored in said external memory is related to the files transmitted to the portable terminal. Thus, on the basis of the attributes, one or a plurality of files can be selected for transmission to the portable terminal, if necessary. To be more exact, the method of the present invention is mainly characterized in that one or more groups of data stored into the external memory that is external of the portable terminal are selected, at least one attribute of said one or more groups of data is transmitted to the portable terminal, said attribute being stored in the portable terminal, wherein when the portable terminal is to process data from one of said groups of data, at least a part of the data from said one of said groups of data is transmitted to the storage memory of the portable terminal. The data processing system according to the invention is primarily characterized in that the data processing system further comprises means for selecting one or more groups of data stored in external memory, means for transmitting to the portable terminal at least one attribute of said one or more of the selected groups of data, said portable terminal comprising a memory for storing the attribute, and said system comprising means for transmitting to the portable terminal at least a part of the data in the group of data stored in the external memory, to be processed in the portable terminal. The portable terminal according to the invention is mainly characterized in that the portable terminal comprises means for receiving at least one attribute of the one or more groups of data stored in external memory means, means for storing the received attribute, and means for receiving at least a part of the data in the group of data selected from the groups of data stored in the external memory, to be processed in the portable terminal.

The present invention shows remarkable advantages over solutions of prior art. The invention can be used to facilitate file processing in portable terminals with relatively limited available memory space for storing a large quantity of files simultaneously. Since the method of the invention enables creating of a sort of virtual memory in the portable terminal, the memory amount of the terminal is no longer the most limiting factor for the number of files or the total file size processable in the terminal simultaneously. In the method according to the invention, actual files are generally not stored into the memory of the portable terminal, but mainly attribute data related to the files, such as the name, size, creation and change time, and/or possibly other attributes, such as whether the file is a hidden file, a read-only file wherein editing is not allowed, etc. Consequently, the total data in the files processed in the portable terminal can be significantly larger compared to a situation in which prior art techniques are applied. Once the user selects a file to be processed, this file is downloaded from the external storing location into the memory of the portable terminal, if necessary. In the method according to a preferred embodiment of the invention, a so-called cache is further provided in the portable terminal, in which e.g. the latest processed file or a few latest processed files and/or the most often processed file is stored. Consequently, it is not necessary to download such a file from the external memory before the user starts processing the file in the portable terminal.

Depending on the situation and the need, large/small files can be kept in the cache. In some situations it may be preferable to avoid loading large files, e.g. abroad where data calls are costly, or when the user is moving between different mobile station networks, due to the slow FLASH memory, or if only a slow circuit switched connection is available, instead of a packet switched connection (GPRS) or a fast circuit switched connection (HSCSD). Moreover, if the portable terminal lacks an application (such as a slide presentation viewer/editor), it is unnecessary to keep files processed with such an application stored in the cache or other memory of the portable terminal.

The invention provides the further benefit that the user does not need to take care of copying the changed files into the external memory, but instead the system can attend to this automatically. Consequently, this diminishes the risk that the user would start processing an earlier version of a file, in which all the latest changes are not stored. Further, in the method according to a preferred embodiment of the invention all such files are removed from the memory of the portable terminal, which have not been processed within a certain period of time, wherein the storage capacity of the portable terminal is not wasted on such older files.

DESCRIPTION OF THE DRAWINGS

In the following, the invention will be described in more detail with reference to the appended drawings, in which.

DETAILED DESCRIPTION OF THE INVENTION

Figure 1:
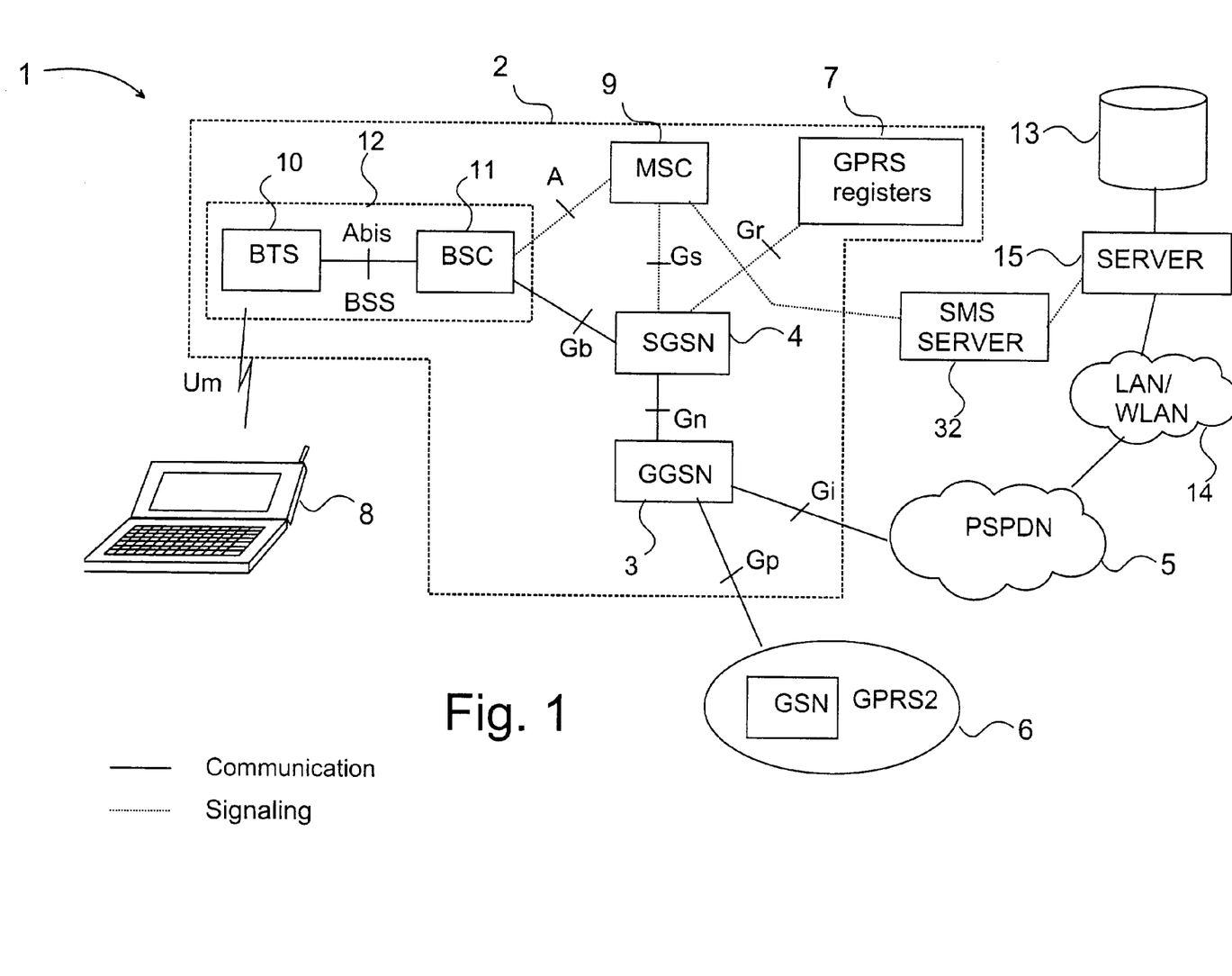
FIG. 1 shows, in a reduced block chart, the system according to a preferred embodiment of the invention applied in a GSM mobile communication system.
Figure 2:
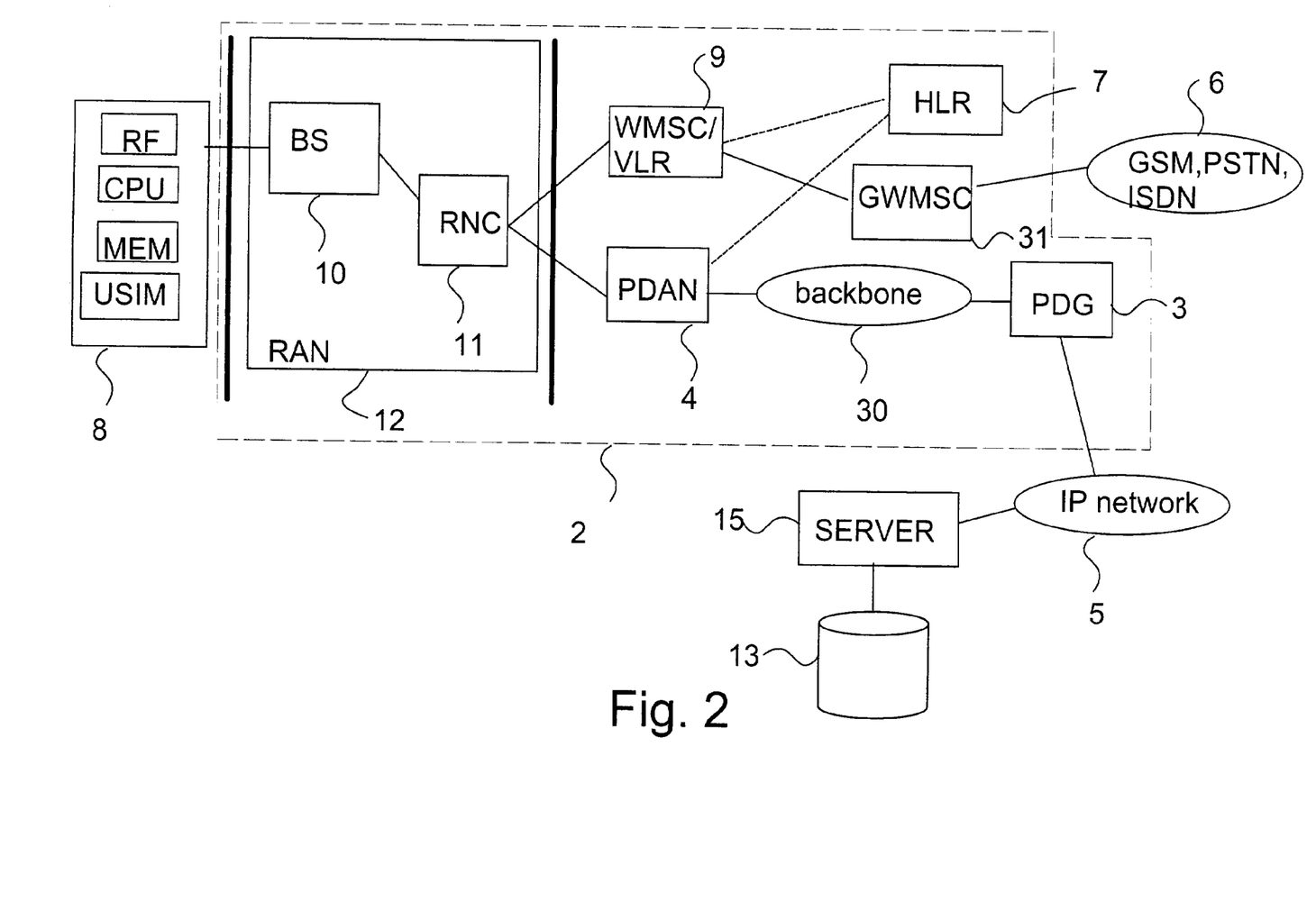
FIG. 2 shows, in a reduced block chart, the system according to a preferred embodiment of the invention applied in a UMTS mobile communication system.

In the following description of a preferred embodiment of the invention a communication network 2 is exemplified by the general packet radio service GPRS of the GSM mobile communication system, with reference made to the reduced chart of FIG. 1 illustrating a data processing system. In a corresponding manner, FIG. 2 illustrates, in a reduced block chart, a UMTS type mobile communication system in which the invention can also be applied. Nevertheless, it is obvious to anyone skilled in the art that the invention is not limited only to said systems, but it can be applied also in other communication systems 1, which the portable terminal 8 can be arranged to communicate to.

FIG. 1 shows the communication system according to a preferred embodiment of the invention in a reduced block chart. The communication system comprises one or a plurality of communication networks 2, such as a mobile communication network. The mobile communication network used in this preferred example is thus the packet switched network service GPRS of the GSM mobile communication system. The main element in the infrastructure of the GSM mobile communication system for GPRS services is a GPRS support node 3, 4, a so-called GSN. It is a mobility router implementing switching and cooperation between different data networks, e.g. to a public switched packet data network (PSPDN) 5 through a connection Gi, or to the GPRS network 6 of another operator through a connection Gp, mobility management with GPRS registers 7 through a connection Gr, and transmission of data packets to portable terminals 8, irrespective of their location. Physically the GPRS support node 3, 4 can be integrated with a mobile switching center (MSC) 9, or it can constitute a separate network element based on the architecture of data network routers. User data travels directly between the support node 3, 4 and a base station subsystem 12 (BSS) composed of base stations 10 (BTS) and base station controllers 11 (BSC) through a connection Gb, but there exists a signalling connection Gs between the support node 3, 4 and the mobile switching centre 9. In FIG. 1, the unbroken lines between the blocks illustrate data communication (i.e. transfer of speech and data in digital form), and the broken lines illustrate signalling. Physically data can travel transparently through the mobile switching centre 9. The radio interface between the portable terminal 8 and the fixed network travels through the base station 10 and is marked with reference Um. References Abis and A illustrate the interface between the base station 10 and the base station controller 11, and in a corresponding manner, between the base station controller 11 and the mobile switching centre 9, which is a signalling connection. Reference G illustrates a connection between different support nodes 3, 4 of the same operator. The support nodes are usually divided into gateway support nodes (GGSN) 3 and serving, i.e., home support nodes (SGSN) 4, which are shown in FIG. 1.

Serving GPRS support nodes 4 are connected to a mobile communication network in a manner that they can provide packet switching services to terminal devices through base stations 10. The mobile communication network attends to packet switched communication between the support node 3, 4 and the portable terminal 8. Different subnetworks can, in turn, be connected to external data networks, such as the public packet switched data network 5, through GPRS gateway support nodes 3. Thus, the GPRS service enables packet data transmission between the portable terminal 8 and an external data network 5, wherein certain parts of the mobile communication network constitute an access network. Examples of applications utilizing packet data transmission include Internet telephone traffic, video conferencing, file transfer, and WWW (World Wide Web) and WAP (Wireless Application Protocol) browsing.

The data processing system according to a preferred embodiment of the invention shown in FIG. 1 is provided with a memory 13 (such as any type of memory for storing data, including hard drives, random access memory (RAM) of any type, etc.) located outside (external of) the portable terminal, e.g. for storing files. In this example the memory 13 is provided in connection with a server 15 of a local area network 14. Hence, the server 15 of the local area network 14 and the portable terminal 8 can be set to a communication connection, e.g. via a mobile communication network 2, and the external memory 13 can be used as a so-called virtual memory of the portable terminal 8. The communication connection can also be arranged in a manner that the portable terminal 8 is switched to the local area network 14 or directly to the server 15, either through wires or wirelessly. Such an external memory 13 also refers to such memory that can be attached through other means than via the communication network through wires or wirelessly to the portable terminal 8. Examples that could be mentioned include a supplementary memory card (not shown) attached to the portable terminal 8 or a memory (not shown) connected to the portable terminal 8 through a cable or wirelessly.

In the embodiment of FIG. 1 a connection is provided between the server 15 of the local area network 14 and the short message service (SMS) server 32 for transmission of short messages (text messages) through a mobile communication network 2 between the portable terminal 8 and the server 14.

Figure 3:
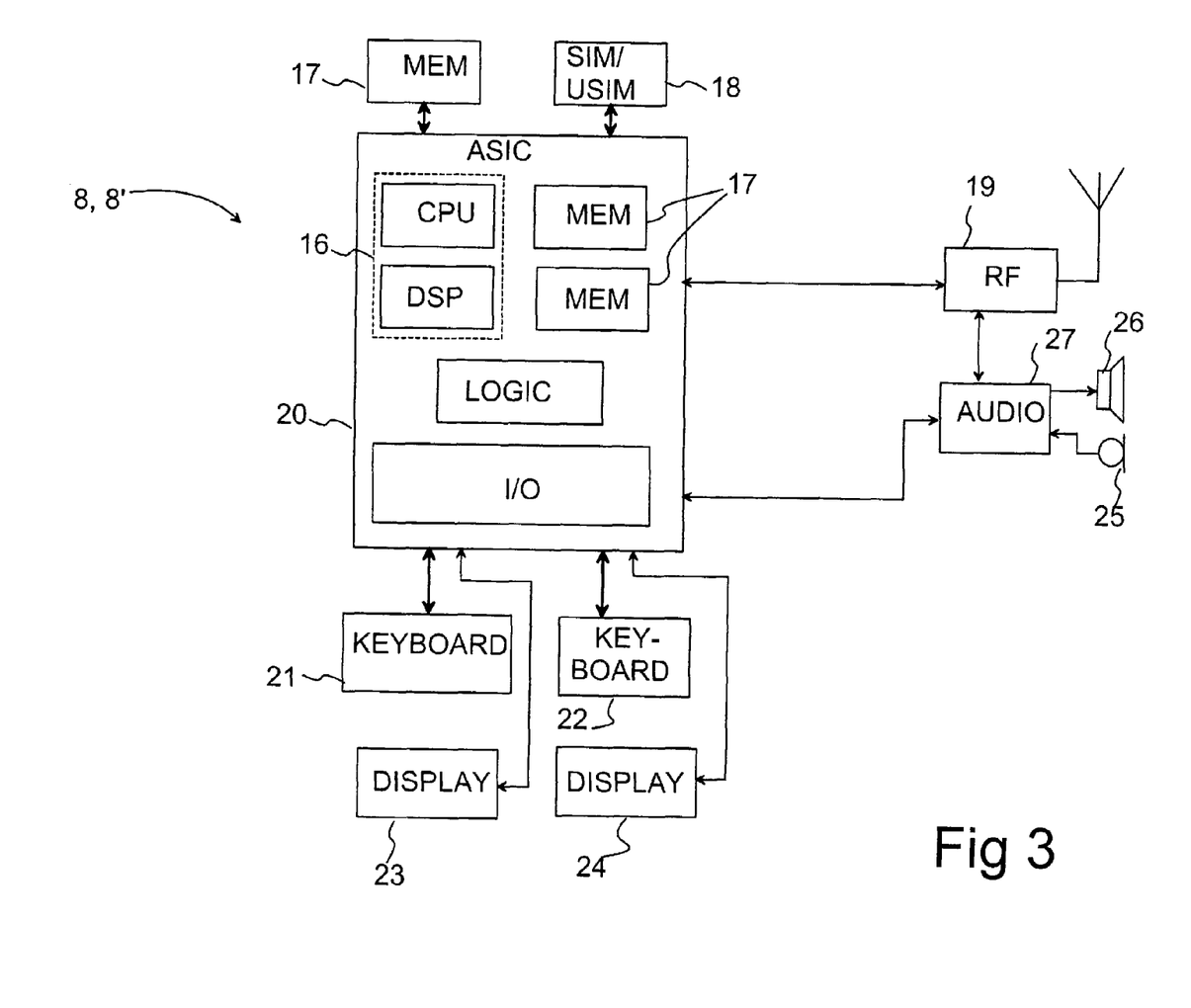
FIG. 3 shows, in a reduced block chart, a portable terminal according to a preferred embodiment of the invention.

FIG. 3 shows, in a reduced block chart, a portable terminal 8 complying with a preferred embodiment of the invention, and which is here exemplified by a communication device comprising data processing functions and mobile station functions, such as Nokia 9210 Communicator. The portable terminal 8 comprises e.g. one or a plurality of processors 16 (CPU, central processing unit; DSP digital signal processor), memory 17, a subscriber identity module 18 (SIM, or USIM=UMTS subscriber identity module), or the corresponding means for identification of the subscriber, and a radio part 19 for communication with the base station 10. The processor 16 can be integrated e.g. in an application specific integrated circuit 20 (ASIC), by which a large number logical functions of the portable terminal 8 can be performed. The memory 17 (storing memory) preferably comprises a random access memory (RAM), a read only memory (ROM), and at least a part of the memory of the subscriber identity module 18. The portable terminal 8 also comprises one or more user interfaces, preferably comprising a keypad 21, 22, or another means for entering data, such as a touch screen (not shown), a display device 23, 24, and audio means, e.g. a microphone 25, a speaker 26 and a codec 27.

Let us assume that in the memory 13 a so-called directory tree is provided, in which a plurality of files are stored. Such a directory tree forms a hierarchical system which facilitates e.g. grouping and finding of files compared to applications in which all the files are stored in a single level. Defining and editing the directory tree is prior art known per se to anyone skilled in the art, wherein it is not necessary to describe it in more detail this context. In the different branches of the directory tree, characteristics (attributes) can be defined which describe e.g. the name of the branch in question, whether the branch is write-protected, and whether it is hidden or visible. In the branches of the directory tree files can be stored, wherein properties can be defined for them as well. The properties of the files can indicate e.g. the file name, file size, edit/creation time (date and time), whether the file is hidden or visible, file type (system file, text file, spreadsheet file, presentation file, graphics file, etc.), whether the file is protected, encrypted, compressed, read-only, copy-protected, the application intended for opening and/or editing the file, and whether the application is installed in the portable terminal.

In the system according to a preferred embodiment of the invention, the user of the portable terminal 8, or e.g. the local area network 14 administrator of the company, determines a branch or branches whose files can be transferred between the portable terminal 8 and the local area network 14. As a result, the virtual notebook feature can be applied in the following advantageous manner. The user updates the data in the directory tree for the portable terminal 8 by entering a command set for this purpose or by initiating, in the portable terminal 8 or in a workstation (not shown) connected to the local area network 14, an application by which the updating of the directory tree is performed. Thus, the portable terminal 8 and the server of the local area network 14, in connection with which the memory 13 is provided, communicate with each other in order to change data. This can be carried out e.g. in a manner that the portable terminal 8 is switched through wires or wirelessly to the local area network 14, or in a manner that the portable terminal 8 and the server 15 comprise local communication means, such as radio communication means (for example Bluetooth™), infrared communication means or the like. Communication can be implemented also through a communication network, such as the mobile communication network 2, wherein e.g. the selection of data group can be changed when the portable terminal 8 is not connected to communicate locally with the local area network 14. Once communication is taking place, the server 15 of the local network transmits to the portable terminal 8 information of the selected parts of the directory tree structure. In addition, to the portable terminal 8 information is transmitted of the files contained in the selected branches of the directory tree. The attributes to be transferred preferably comprise at least the file name, file size, edit/creation time, and file type. However, the actual files are usually not transferred at this phase.

Figure 4:
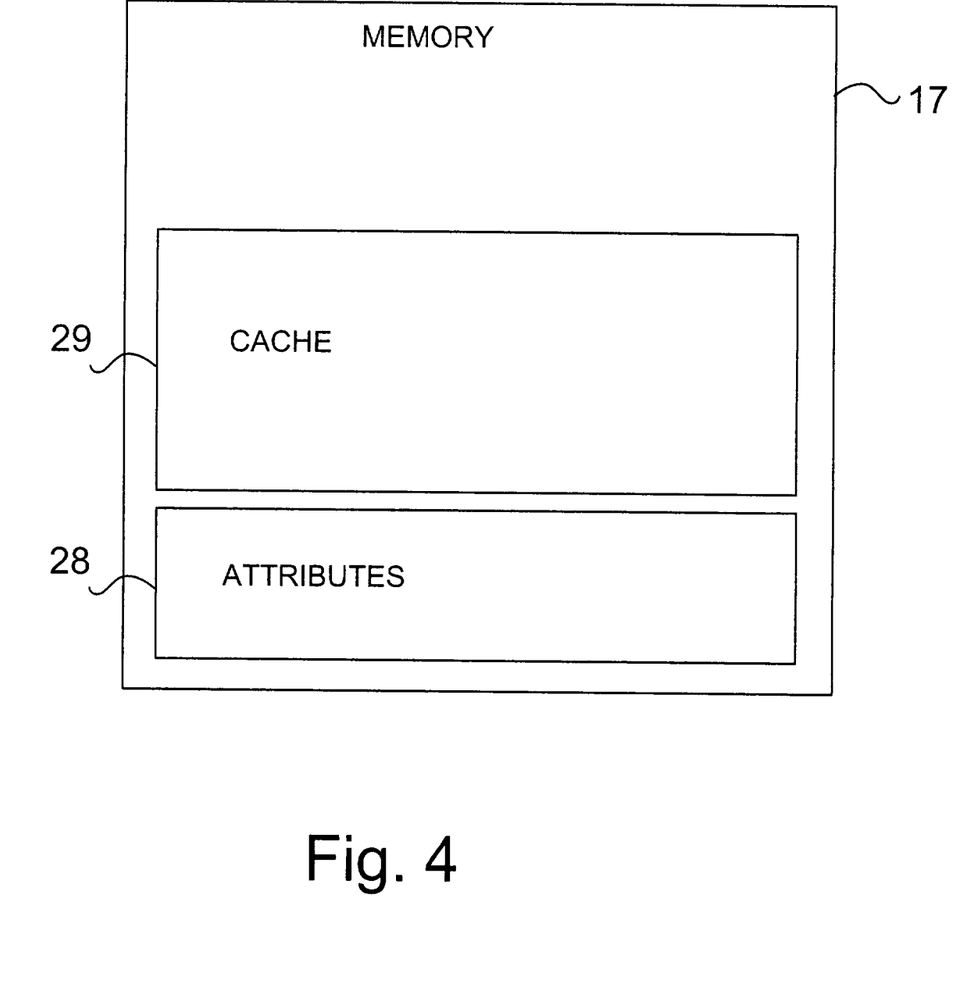
FIG. 4 shows, in a reduced manner, the structure of the memory of the terminal according to a preferred embodiment of the invention.

A memory space 28 is reserved in the memory 17 of the portable terminal 8 for storing these attributes of the directory tree and/or files. The size of this memory space 28 can be also changeable, wherein memory can be allocated according to the present needs. This memory allocation is shown in principle in FIG. 4. The memory 17 can also be provided with a cache 29, in which files or parts thereof can be filed. For example files that are used often and/or the last used file can be transferred to the cache 29. Even more files can be transferred there, provided there is enough memory space. If a whole file does not fit into the cache 29, it is preferably not stored at all. Because storing the attributes of files usually requires much less memory than storing the actual files, the method of the invention can be used for storing data of a significantly larger amount of files than in prior art solutions, in which also the files are stored into the memory of the portable terminal. Nevertheless, in the method according to the present invention the user can also edit files having only their attributes stored.

When the user has updated the data in the portable terminal 8 in a manner described above, the user can determine which files are available in the memory 13. If the user, e.g. when travelling, wishes to start processing a file stored in said branch of the directory tree, the following steps are carried out in the method of a preferred embodiment of the invention. The user starts an application applicable for processing said file, such as a word processing program, in the portable terminal 8. The user informs the application that a certain file should be opened. The application transmits the file name and the branch of the directory tree to the operating system or the like, in which it is preferably examined whether the file exists in the cache 29. If the file is stored in the cache, it can be loaded from the cache to the application and the editing of file can be started. However, if the file cannot be found in the cache 29, or the cache 29 is not realized in that particular portable terminal 8, the loading of file is started from the memory 13 of the local area network server. It is also possible to allow the user to select the connection used in loading or to prevent loading of the file.

The above-mentioned transfer of the file name and other possible data from the terminal 8 to the memory 13 can be carried out through a prior art method, such as via data connection or packet switched connection, by text messages, etc.

To download a file, a communication connection is set up from the portable terminal 8 to local area network server 15, preferably through a mobile communication network. This connection is preferably a packet switched connection, such as a GPRS packet switched connection, but it can also be a so-called circuit switched connection, or even a local wireline or wireless connection to the local area network 14. Also other communication methods can be used, such as text messages. Further, different criteria can be taken into account when selecting the communication method, such as the price, speed, transmission reliability, etc. In some connection forms, the price of the communication can vary according to the time of day, as well as the amount of information transferred, and/or the communication speed. To this end, the user may wish to select the most advantageous, or otherwise the most appropriate transfer method for the particular situation.

The local area network server 15, in turn, examines whether said file still remains stored in the appointed location in the memory 13. Having found the file, the local area network server 15 preferably transfers file attributes to the user, who can decide whether the file should be retrieved, e.g. whether it is large and only a slow connection is available, whether the user is abroad, or the like. If the file is retrieved, the local area network server 15 starts transmitting the file to the portable terminal 8 using the communication connection that has been set up. In the portable terminal 8, the data is received and stored into memory 17, preferably to the cache 29, and the communication connection can be cut. Subsequently, information on the reception and location of file is transmitted to the application, whereafter the processing of the file can be started.

In a preferred embodiment of the invention, files can be transferred to the cache 29 using advantageously a local connection. Thus, e.g. the user can select which files should be transferred from the cache 29 to the memory 17. The files that are not selected for transmission can thereafter be removed from the cache 29.

The above-mentioned interrogation can also be performed using e.g. text messages, which will also save connection costs. If the file is not found, there is no need to retrieve it. However, it the file is found, the system can inform this, e.g. by one or a plurality of text messages, in which attributes of the file can be added. Therefore, on the basis of the attributes, the user can allow or prevent retrieving of the file. This option is preferable e.g. in a situation in which the particular file has not been processed for a long time, wherein the user may be unaware when and by whom the file has been last edited. Further, if the file in question is a so-called shared file or if it has been edited by several persons, it may be difficult, if not impossible, to determine who was the last person to edit the file and when did that happen.

The file is stored after it has been processed, and possibly also while it is being processed. The storing can be carried out either locally in the portable terminal 8, and/or the changed file can be transferred to the memory 13 of the local area network server 15, if it is wished that the changes can be used substantially directly after the changes have been done also in workstations connected to the local area network 14. To this end, if necessary a communication connection is set up to the local area network server 15, and the file transfer is started from the portable terminal 8 to the local area network server 15, which stores the file into the memory 13.

Files that have been processed in the portable terminal 8 can also be updated to the memory 13 when the user is back in the office. Thus, it is possible to use either the local area network 14 or local communication between the server 15 and the portable terminal 8. In the updating phase, the attributes of files stored into the portable terminal 8 are examined and compared with the attributes of corresponding files stored in the memory 13 of the server 15. If differences are found in the attributes, such files are updated, preferably in a manner that the file version with an older edit time is replaced by a more recent file version, regardless of which of the memories 13, 29 the more recent file is located in. On the other hand, it is possible to ask the user which version should be saved, or the user can be given a chance to check the different file versions in order to decide which version to save.

Upon updating the files, it is, however, possible that both file versions have been changed after the last updating, wherein the changes made in one of the file versions can be lost in the updating. This can be prevented e.g. in a manner that when transferring the edited file to the portable terminal 8, the file is locked in the memory 13 of the file in a manner that the others cannot change said file. The locking can be released after the updating from the portable terminal 8 to the memory 13 of the server has been carried out. To avoid unnecessarily long locking times, the updating should be carried out as soon as possible after the changes have been made.

Hereinabove, a situation has been described, in which the user of the portable terminal 8 updated a certain part of the directory tree in the memory 13 to the portable terminal 8, e.g. when leaving the office. For practical reasons it is, however, usually not reasonable to lock such files in the memory 13, because in that case only the user of the portable terminal could edit the files. To eliminate the need for such lockings, the following step can be carried out in a preferred embodiment of the system according to the invention. If the files stored in the memory 13 are edited, e.g. at the workstation of the local area network 14, the user of the portable terminal 8 is informed of the changes, or the changes are updated automatically in the portable terminal 8. To implement this, the system can be provided e.g. with a data base or the like containing information on which parts of the directory tree have been updated in the portable terminal 8. Thus, when changes are directed to a such part of the directory tree, the corresponding portable terminals 8 are informed of this, e.g. by transmitting the changed attribute data of the part of the directory tree in question to the portable terminal 8.

The method of the invention can also be applied in a manner that the user of each portable terminal 8 defines in the memory a directory tree portion of his/her own, which the other users of the local area network 14, or the users of other portable terminals 8 cannot edit. In this case it is not necessary to perform the updatings directly after the changes. This arrangement makes it possible that each user can be provided with his/her own memory space in the memory 13.

Various functions can be added for use in the cache 29. The user can e.g. define a file or a plurality of files that should be stored up in the cache. Thus, the free space of the cache can be used in the aforementioned manner for loading files to the portable terminal 8, if necessary. In addition, the user can determine a storage time for the files in cache, wherein files that are older than that are removed from the cache 29 automatically, wherein more space is available for other files. The above arrangement can also be used to ensure that older files that the user is unlikely to need are removed from the cache automatically. Hence, it is not necessary for the user to remember which files are no longer needed. In spite of this, it is preferable that the user has the option to determine which files cannot be removed even after the expiry time.

The cache 29 enables processing of files even in a situation in which no connection can, for some reason, be set up between a portable terminal 8 and the memory 13 of the server. This may happen e.g. when the user is outside the operation range of a mobile communication network, or when travelling on aircraft.

The cache 29 can also be implemented as a so-called ring buffer. In this case, when no free space is available in the cache 29, new/edited files are stored to replace the oldest files. Nevertheless, it is preferable that only files that are stored with the same contents in the memory 13 can be removed from the cache 29. If this is not the case, the edited files should first be transferred from the cache 29 to the memory 13. The updating of changed files can be determined to be carried out either substantially directly after the changes have taken place, if possible e.g. when the user gives a store command or the like, or the next time when a communication connection is set up between the portable terminal 8 and the memory 13.

Even if the file operation hereinabove refers to editing the files, it is also obvious that in the system according to the invention other operations can be directed to the files. Files can be deleted and new files can be stored, file names and locations of files in the directory tree can also be changed. The principles presented hereinabove can also be applied in updating such changes into the memory 13.

The present invention can be implemented, to a great extent, as a program in the application software of the portable terminal 8 and/or the server 15. The portable terminal 8 can, e.g. in a so-called resource manager program, be provided with a function, whereby the user can define certain parameters, such as the cache 29 size, expiry time for files, which part of the directory tree is stored in the memory (or the whole directory tree/a plurality of directory trees), etc. In addition, a separate program can be designed for updating the files, or a function can be added in said resource manager program for updating the changes between the portable terminal 8 and the memory 13.

FIG. 2 shows yet another mobile communication system, in which the invention can be applied. FIG. 2 uses the same references as FIG. 1 when referring to analog functional blocks, although the terms can differ in different systems. This mobile communication system is a UMTS system, comprising a portable terminal 8, a radio access node 12 (RAN) which comprises a base station 10 (BS), and a radio network controller 11 (RNC), which controls the base station 10 and routes the connections between the base station 10 and the rest of the system, a wireless mobile switching centre 9 (WMSC) and a packet data access node 4 (PDAN) as routing possibilities in addition to the radio network controller 11. The UMTS system according to FIG. 2 also comprises e.g. a backbone network 30 and a packet data gateway 3 (PDG) to other packet networks, such as the Internet Protocol (IP) network 5, wherein the portable terminal can communicate with e.g. a server 15 coupled to the IP network. Furthermore, FIG. 2 shows a circuit switched gateway 31 (Gateway to Mobile services Switching Centre, GWMSC) to couple to e.g. to a second mobile communication network 6, and a home location register 7 (HLR) e.g. to store the subscriber's access contract data. The invention is implemented in this mobile communication system largely according to the same principles as has been already presented in connection with the GPRS packet data network, wherein a more detailed description of the invention in view of this mobile communication network is unnecessary.

Figure 5:
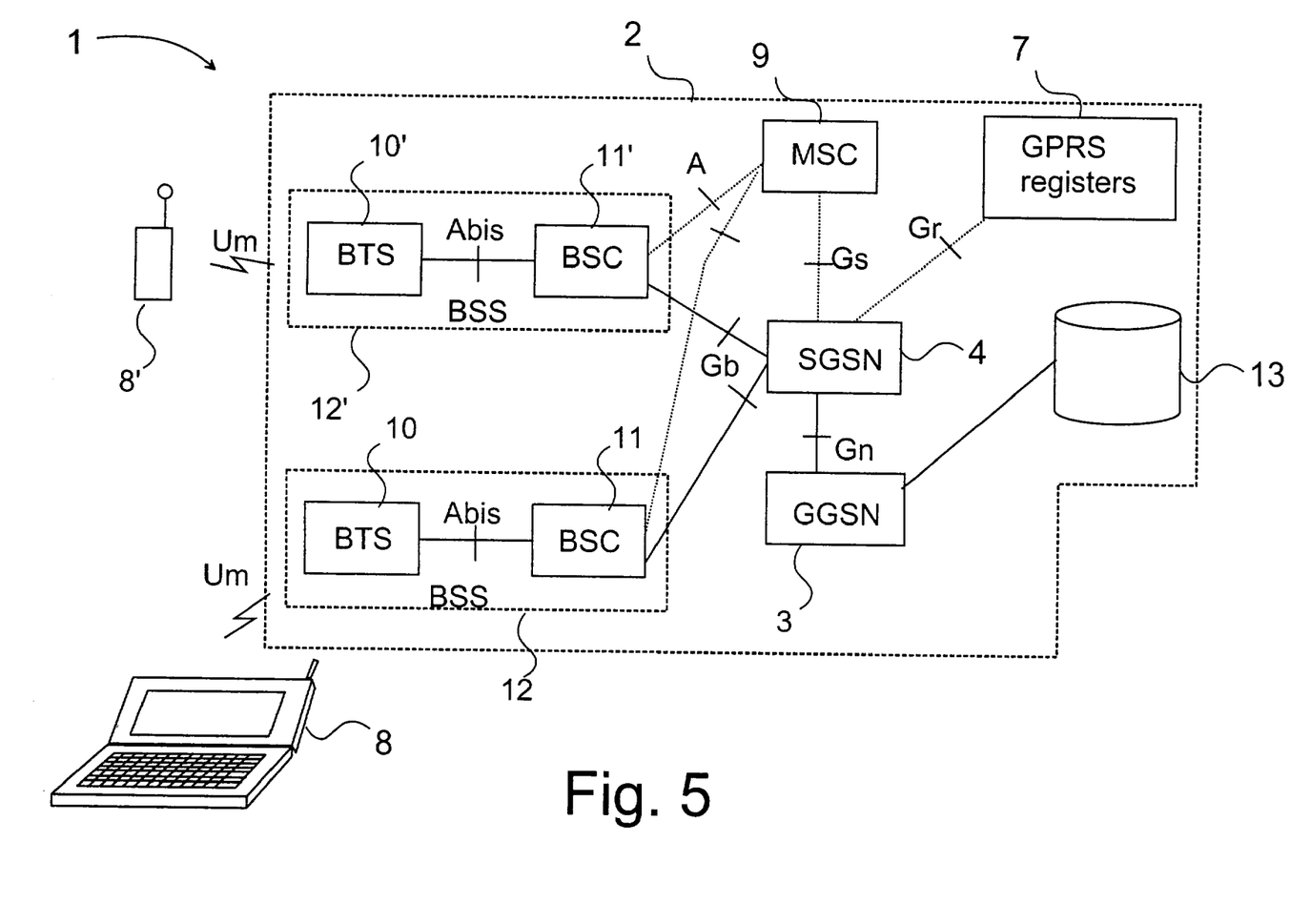
FIG. 5 shows, in a reduced block chart, the system according to a second preferred embodiment of the invention applied in a GSM mobile communication system.

Further, FIG. 5 shows the data processing system 1 according to a preferred embodiment of the invention in a reduced block chart. The system comprises a mobile communication system 2, such as a GSM network and/or a UMTS network, which is provided with auxiliary memory 13 of the portable terminal 8. In this embodiment the memory 13 is preferably arranged in connection with a serving support node 4. This is a unit controlled by a mobile network operator, the mobile network operator being able in this unit to allocate the mobile phone subscribers (users) a memory space to be used as an auxiliary memory of the portable terminal 8. Data transfer between the portable terminal 8 and the memory 13 can be carried out preferably as packet switched communication, the portable terminal 8 being operated within the operation range of a telenetwork, such as the mobile communication network 2 in question. The mobile network operator can price this kind of memory service e.g. based on the storage capacity allocated for the user. The user can be identified e.g. by means of a subscriber identification module 18 inserted in the portable terminal 8. If necessary, it is possible to define that the user must enter a user name and a password before using the service and possibly also when starting to transmit data between a portable terminal 8 and the memory 13.

In this embodiment the user can define for the data stored in the memory 13 whether other users are also allowed to read the files or a part of them. To this end, such second user, who has been authorized by the user of the portable terminal 8 to at least read the data, can read the user's files by using his/her own portable terminal 8'. Such arrangement enables transmission of data between portable terminals 8, 8' without the need that both portable terminals 8, 8' be used and connected to the mobile communication network 2 simultaneously. The memory 13 can also be used as a kind of buffer to level out loading peaks e.g. when the circuit switched connection is not used between the portable terminals 8, 8'. Thus, information transmitted from one portable terminal 8 is stored in the memory 13 and from there the information is further transmitted to a second portable terminal 8' once the data transmission capacity of the mobile communication network 2 is available.

It is obvious that the present invention can also be applied without a mobile communication network 2 or a local area network 14. In this case the portable terminal 8 communicates e.g. with a desktop computer (not shown) either through wires or wirelessly. Also in this case, mainly data on file attributes is transmitted to the portable terminal 8, but actual files are not transmitted unless they are processed in the portable terminal 8.

The communication channel used in the communication between the portable terminal 8 and the external memory 13 can be selected in some situations from two or more different communication channels. These include e.g. local communication means, local area network, mobile communication network, Internet network, and public switched telephone network. Various criteria can be used for selection of the communication channel used at the time, and the criteria used in different situations can be different. For example, price, speed, accuracy, and/or encryption of the communication connection can be used as selection criteria. The location of the portable terminal 8 can also be a selection criterion, as also the provider of the communication service (e.g. mobile network operator, Internet operator, public switched telephone network operator). Different mobile communication networks usually have a different mobile communication operator, wherein e.g. when the user moves from one country to another the mobile communication operator can change, if the mobile communication network changes (roaming). It is obvious that also other criteria can be used than those presented above.

A large array of different attributes can be applied to the files, which has partly been described already. These attributes may include e.g. file name, file type, file size, location (directory path), creation date, edit date, file author, file editor, application suitable for processing, information on possible protection and/or encryption, digital signature, copy protection, highest allowable number of edit times and/or expiry time, information on devices that are allowed to process the file, information on the operations the user can perform to the file (e.g. read, read-write, delete), whether the file is compressed (compression algorithm), etc. Possible attributes particularly for text files can include also number of words, number of paragraphs, language, document template, etc. Graphics file attributes may include image resolution and files containing video information may include e.g. an attribute indicating the number of images per time unit and/or transmission speed required for real-time viewing. It is obvious that other attributes can be defined and, on the other hand, it is not necessary to define all the attributes, but even e.g. one attribute can be sufficient.

It is not presumed that the server 14 should necessarily be a computer connected to the local area network through a wired connection, but also the portable terminal can in some cases operate as the server 14. In such cases the user can set up a connection with his/her portable terminal 8 to this portable terminal that is operative as the server 14, and perform operations corresponding to the ones described hereinabove.

It is obvious that the present invention is not limited solely to the above-presented embodiments, but it can be modified within the scope of the appended claims.

What is claimed is:

1. A method for processing data in connection with a portable terminal, in which method an external memory that is external of the terminal is used for storing groups of data, at least one attribute is determined for said groups of data, data is stored in a storage memory of the portable terminal, and at least one group of data can be processed in the portable terminal, wherein at least one group of data stored in the external memory is selected by the portable terminal, said at least one attribute of said at least one group of data is transmitted to the portable terminal via a user selectable transfer method, said attribute being stored in the portable terminal, wherein when the portable terminal is to process data related to said attribute from said selected at least one group of data, at least a part of the data from said selected at least one group of data is transmitted to the storage memory of the portable terminal via said user selectable transfer method and said at least one group of data is processed by said portable terminal, and wherein when data related to said attribute from said selected at least one group of data is modified in said external memory an updated attribute of said at least one group of data is transmitted to the portable terminal.

2. A method of claim 1, wherein a cache memory is provided in the portable terminal, wherein said cache memory is used as said storage memory where information of the transmitted group of data is stored.

3. A method of claim 2, wherein when processing in the portable terminal one of said groups of data stored in the external memory, the existence of the group of data is examined in the storage memory, and in case the processed group of data is stored in the storage memory, the group of data stored in the cache is processed, or if the processed group of data is not stored in the storage memory, the group of data is downloaded from the external memory to the portable terminal.

4. A method as set forth in claim 1, wherein information on changes related to the group of data is transmitted from the portable terminal to the external memory.

5. A method as set forth in claim 4, wherein one or a plurality of conditions is defined for starting the transmission of the editing data, and that one condition used is that the editing has been terminated.

6. A method as set forth in claim 5, wherein a communication connection is set up between the portable terminal and the external memory, wherein information of the editions performed for the groups of data edited in the portable terminal is transmitted after the communication connection has been set up.

7. A method as set forth in claim 1, wherein one or more groups of data stored in the external memory is edited, wherein information that the editing has been carried out is transmitted to the portable terminal.

8. A method as set forth in claim 1, in which one or more groups of data stored in the external memory is edited, wherein the changes are transmitted to the portable terminal.

9. A method as set forth in claim 1, wherein one or more groups of data is defined to be stored in the storage memory, the total size of said groups of data being smaller than the size of the storage memory, wherein free storage memory is used for loading groups of data from the external memory to the storage memory.

10. A method as set forth in claim 1, wherein an expiry time is defined for the groups of data stored in the storage memory, wherein groups of data older than the expiry time are removed from the storage memory.

11. A method as set forth in claim 1, wherein for data transmission between the portable terminal and the external memory, at least two communication channels can be selected, and that at least one of the following is considered when selecting the communication channel:
   price,
   speed,
   reliability,
   location,
   data transmission service provider.

12. A data processing system comprising a portable terminal, an external memory that is external of the portable terminal for storing groups of data, at least one attribute being defined for said groups of data, and said portable terminal comprising a storage memory for storing data, and means for processing at least one group of data, the data processing system further comprising means for selecting one or more groups of data stored in the external memory, means for transmitting to the portable terminal said at least one attribute of said one or more selected groups of data via a user selectable transfer method, said portable terminal comprising means for storing the attribute, and said system comprising means for transmitting to the storage memory of the portable terminal at least a part of the data in the one or more selected groups of data stored in the external memory via said user selectable transfer method, wherein said processing means of said portable terminal processes said at least part of the data related to said attribute of said one or more selected groups of data, and wherein when data related to said attribute from said selected at least one group of data is modified in said external memory an updated attribute of said at least one group of data is transmitted to the portable terminal.

13. A data processing system as set forth in claim 12, comprising means by which the data selected from the group of data for processing is transmitted from the portable terminal to the external memory by text messages.

14. A data processing system as set forth in claim 12, wherein one or a plurality of conditions is determined for starting the transmission of change data, that at least one condition is that the changes are finished, and that the data processing system comprises means for examining materialization of said one or a plurality of conditions.

15. A portable terminal to be used in a communication system, the communication system having an external memory that is external of the portable terminal for storing groups of data for which at least one attribute is defined, and said portable terminal comprising a storage memory for storing data, and means for processing at least one group of data, the portable terminal further comprising means for selecting at least one or more groups of data means for receiving said at least one attribute of the one or more groups of data stored in the external memory via a user selectable transfer method, means for storing the attribute, means for receiving at least a part of the data in the group of data selected from the groups of data stored in the external memory via said user selectable transfer method, and means for processing by the portable terminal the received at least part of the data related to said attribute of said selected one or more groups of data, and wherein when data related to said attribute from said selected at least one group of data is modified in said external memory an updated attribute of said at least one group of data is transmitted to the portable terminal.

16. A portable terminal as set forth in claim 15, wherein it is a communication device comprising means for carrying out mobile communication functions.

17. A portable device comprising:
   a memory for storing data,
   a processor for processing at least one group of data and for selecting at least one or more groups of data stored in an external memory of a communication system for which at least one attribute is defined,
   said memory of said portable device configured to receive via a user selectable transfer method and store said at least one attribute of the one or more groups of data stored in the external memory and to receive at least a part of the data in the group of data selected from the groups of data stored in the external memory via said user selectable transfer method, and said processor for processing the received at least part of the data related to said attribute of said one or more groups of data, and wherein when data related to said attribute from said selected at least one group of data is modified in said external memory an updated attribute of said at least one group of data is transmitted to the portable terminal.

18. A data processing system comprising:

a portable device comprising a memory for storing data and a processor for processing at least one group of data, an external memory that is external of the portable device for storing groups of data, at least one attribute being defined for said groups of data, a server for selecting one or more groups of data stored in the external memory and for transmitting to the portable device said at least oen attribute of said one or more selected groups of data via a user selectable transfer method, wherein said server is further for transmitting to the memory of the portable device at least a part of the data in the one or more selected groups of data stored in the external memory via said user selectable transfer method, and wherein said processor of said portable device is further for processing said at least part of the data related to said attribute of said one or more selected groups of data, and wherein when data related to said attribute from said selected at least one group of data is modified in said external memory an updated attribute of said at least one group of data is transmitted to the portable terminal.

19. A memory encoded with instructions for execution by a processor of a portable device, said instructions when executed for:

selecting at least one group of data stored in an external memory used for storing groups of data where at least one attribute is determined for said groups of data, causing transmission of at least a part of the data from said selected at least one group of data to a memory of said portable device via a user selectable transfer method, causing transmission to the portable device of said at least one attribute of said at least one group of data via a user selectable transfer method, storing said attribute in the portable device, and processing data related to said attribute from said selected at least one group of data stored in said memory of said portable device, and wherein when data related to said attribute from said selected at least one group of data is modified in said external memory an updated attribute of said at least one group of data is transmitted to the portable terminal.

* * * * *

UNITED STATES PATENT AND TRADEMARK OFFICE
CERTIFICATE OF CORRECTION

PATENT NO.       : 7,366,840 B2
APPLICATION NO.  : 10/286479
DATED            : April 29, 2008
INVENTOR(S)      : Tapola It is certified that error appears in the above-identified patent and that said Letters Patent is hereby corrected as shown below:

In column 15, line 17, claim 18, line 10 "oen" should be -- one --

Signed and Sealed this

Twenty-ninth Day of July, 2008

JON W. DUDAS
*Director of the United States Patent and Trademark Office*